US012632031B2

(12) United States Patent
Ogawa et al.

(10) Patent No.: US 12,632,031 B2
(45) Date of Patent: May 19, 2026

(54) MACHINE LEARNING DEVICE, CLEANING PREDICTION DEVICE, AND CLEANING SYSTEM

(71) Applicant: FANUC CORPORATION, Yamanashi (JP)

(72) Inventors: Kenichi Ogawa, Yamanashi (JP); Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 331 days.

(21) Appl. No.: 18/031,293

(22) PCT Filed: Nov. 2, 2021

(86) PCT No.: PCT/JP2021/040347
§ 371 (c)(1),
(2) Date: Apr. 12, 2023

(87) PCT Pub. No.: WO2022/097624
PCT Pub. Date: May 12, 2022

(65) Prior Publication Data
US 2023/0376002 A1    Nov. 23, 2023

(30) Foreign Application Priority Data
Nov. 9, 2020    (JP) ................................. 2020-186745

(51) Int. Cl.
*G05B 19/4065*         (2006.01)
(52) U.S. Cl.
CPC .................... *G05B 19/4065* (2013.01); *G05B 2219/35111* (2013.01)
(58) Field of Classification Search
None
See application file for complete search history.

(56) References Cited

U.S. PATENT DOCUMENTS 5,559,713 A * 9/1996 Brown ............... G05B 19/4065
                                                                 408/1 R
6,249,599 B1* 6/2001 Kuroda .............. B23Q 17/0928
                                                                 382/152

(Continued)

FOREIGN PATENT DOCUMENTS

CN         106055613        10/2016
CN         108620950 A      10/2018

(Continued)

OTHER PUBLICATIONS

International Search Report issued Jan. 11, 2022, in International (PCT) Application No. PCT/JP2021/040347, with English translation.

*Primary Examiner* — Jennifer L Norton
(74) *Attorney, Agent, or Firm* — Wenderoth, Lind & Ponack, L.L.P.

(57)                  ABSTRACT

A machine learning device has an input data acquisition unit that acquires input data including an arbitrary machining condition for an arbitrary workpiece to be machined by an arbitrary machine tool, a cleaning condition for cleaning, by an arbitrary cleaning device, the inside of a machine by which the workpiece was machined under the machining condition and state information indicating a degree of dirtiness of the inside of the machine before the machining under the machining condition. The device also has a label acquisition unit that acquires, as label data, state information about the inside of the machine after machining under the machining condition and cleaning under the cleaning condition included in the input data, and a learning unit that executes supervised learning using the input data and the label data, so as to generate a learned model.

10 Claims, 10 Drawing Sheets

(56) References Cited

U.S. PATENT DOCUMENTS

| | | | | |
|---|---|---|---|---|
| 10,279,448 | B2 * | 5/2019 | Nakayama | B23Q 17/2409 |
| 10,754,312 | B2 * | 8/2020 | Tango | G05B 15/02 |
| 12,228,907 | B2 * | 2/2025 | Shimoike | B23Q 11/005 |
| 2016/0339553 | A1 * | 11/2016 | Nakazawa | B25J 11/0085 |
| 2017/0043442 | A1 * | 2/2017 | Takikawa | B05B 15/60 |
| 2017/0144262 | A1 * | 5/2017 | Okuda | B05B 13/0431 |
| 2017/0155354 | A1 | 6/2017 | Mukai | |
| 2018/0040460 | A1 * | 2/2018 | Gottscho | H01J 37/32935 |
| 2018/0267489 | A1 * | 9/2018 | Tango | G05B 15/02 |
| 2018/0354125 | A1 * | 12/2018 | Ueda | G05B 19/425 |
| 2019/0039198 | A1 * | 2/2019 | Sugiura | B23Q 17/249 |
| 2020/0279158 | A1 * | 9/2020 | Tsunoda | G06N 3/0442 |
| 2020/0301390 | A1 * | 9/2020 | Albertelli | G05B 19/414 |
| 2020/0338677 | A1 * | 10/2020 | Ozeki | G05B 23/024 |
| 2022/0095879 | A1 * | 3/2022 | Ellingson | A47L 15/0021 |
| 2022/0179390 | A1 * | 6/2022 | Shimoike | G05B 19/40938 |
| 2024/0229234 | A1 * | 7/2024 | Zamarian | C23C 16/4405 |

FOREIGN PATENT DOCUMENTS

| | | |
|---|---|---|
| CN | 111790922 | 10/2020 |
| JP | 2016-168661 | 9/2016 |
| JP | 2017-013182 | 1/2017 |
| JP | 2017-104943 | 6/2017 |
| JP | 2018-153872 | 10/2018 |
| JP | 2019-111637 | 7/2019 |
| JP | 2020-179433 | 11/2020 |

* cited by examiner

ACCUMULATION
OF CHIPS

CHIP
DISCHARGE
PORT (5)

(6)

(2)

WASHING LIQUID

WASHING NOZZLE (1)

(3)

(4)

(DOOR SIDE)

Figure 3:
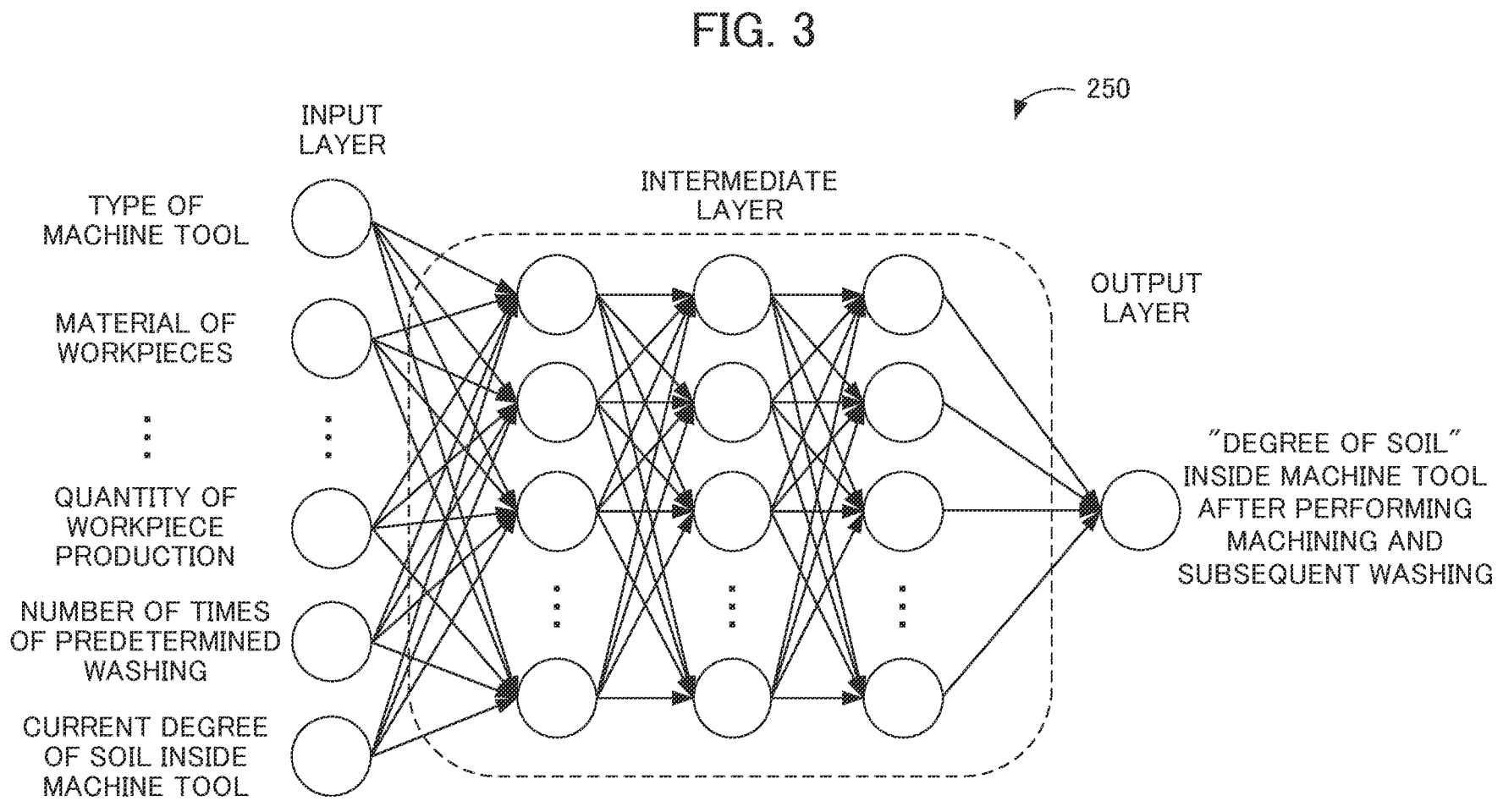

INPUT LAYER

INTERMEDIATE LAYER

OUTPUT LAYER

TYPE OF MACHINE TOOL

MATERIAL OF WORKPIECES

QUANTITY OF WORKPIECE PRODUCTION

NUMBER OF TIMES OF PREDETERMINED WASHING

CURRENT DEGREE OF SOIL INSIDE MACHINE TOOL

"DEGREE OF SOIL" INSIDE MACHINE TOOL AFTER PERFORMING MACHINING AND SUBSEQUENT WASHING

FIG. 5

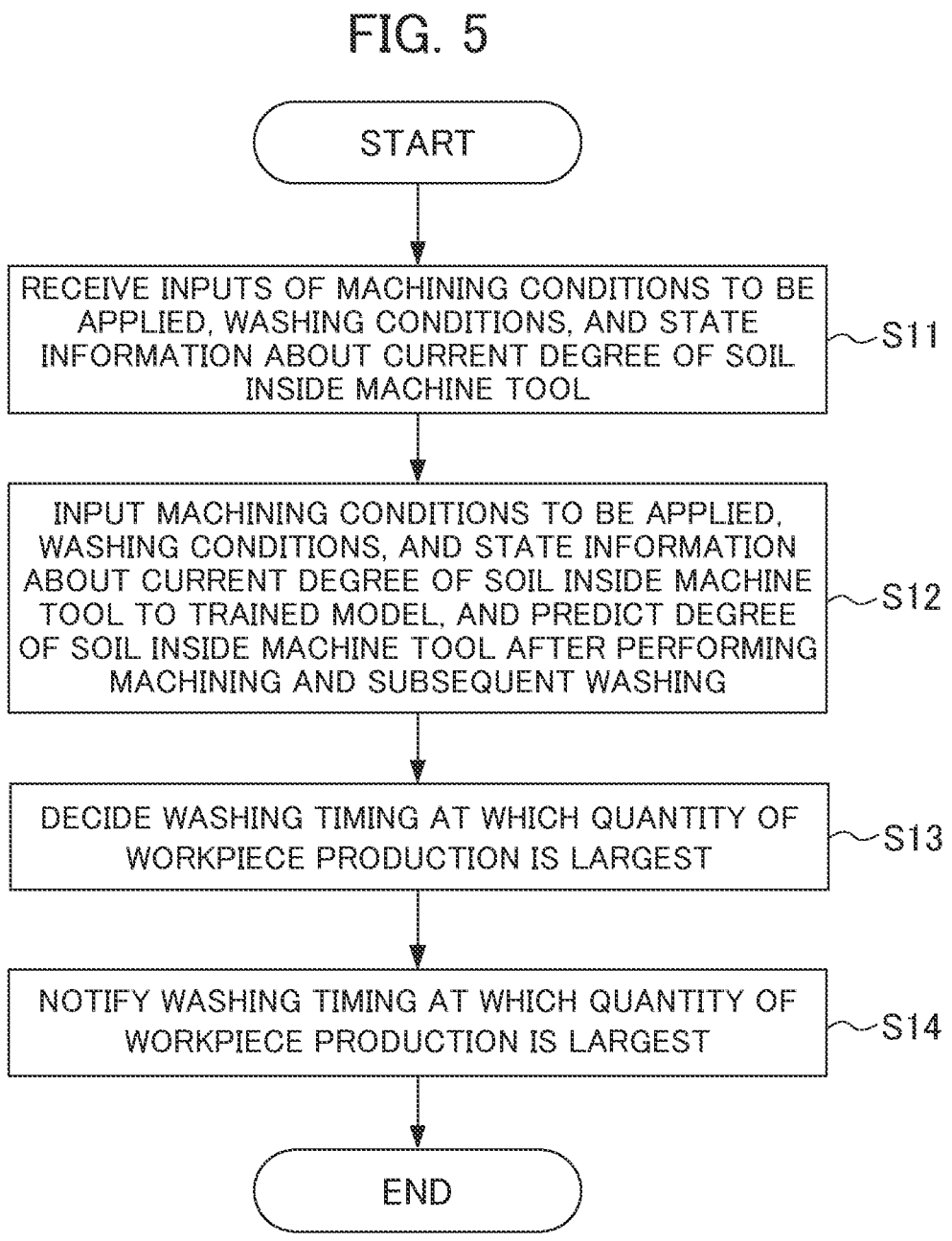

START

RECEIVE INPUTS OF MACHINING CONDITIONS TO BE APPLIED, WASHING CONDITIONS, AND STATE INFORMATION ABOUT CURRENT DEGREE OF SOIL INSIDE MACHINE TOOL — S11

INPUT MACHINING CONDITIONS TO BE APPLIED, WASHING CONDITIONS, AND STATE INFORMATION ABOUT CURRENT DEGREE OF SOIL INSIDE MACHINE TOOL TO TRAINED MODEL, AND PREDICT DEGREE OF SOIL INSIDE MACHINE TOOL AFTER PERFORMING MACHINING AND SUBSEQUENT WASHING — S12

DECIDE WASHING TIMING AT WHICH QUANTITY OF WORKPIECE PRODUCTION IS LARGEST — S13

NOTIFY WASHING TIMING AT WHICH QUANTITY OF WORKPIECE PRODUCTION IS LARGEST — S14

END (DOOR SIDE)

(DOOR SIDE)

FIG. 10

MACHINE LEARNING DEVICE, CLEANING PREDICTION DEVICE, AND CLEANING SYSTEM

TECHNICAL FIELD

The present invention relates to a machine learning apparatus, a washing prediction apparatus, and a washing system.

BACKGROUND ART

In a case where a washing device (for example, a device fixed inside a machine tool or a device that operates by being grasped by a robot or the like) washes the inside of a machine tool, it is common to wash the inside of the machine tool with a predetermined frequency.

Patent Documents 1 to 3 propose technologies for measuring an amount of accumulation of chips using a visual sensor to judge whether washing (cleaning) is to be performed or not.

Patent Document 1: Japanese Unexamined Patent Application, Publication No. 2016-168661

Patent Document 2: Japanese Unexamined Patent Application, Publication No. 2017-013182

Patent Document 3: Japanese Unexamined Patent Application, Publication No. 2017-104943

DISCLOSURE OF THE INVENTION

Problems to be Solved by the Invention

In the case of washing the inside of a machine tool with a fixed frequency, a worker empirically decides the frequency based on the shapes of chips, the number of machined workpieces, and the amount of accumulation.

As for a method for checking the amount of accumulation of chips by the visual sensor, the worker decides whether the checking is to be performed by the visual sensor each time a workpiece is machined or after several workpieces are machined.

While the inside of the machine tool is being washed (cleaned), or while the amount of accumulation of chips is being checked by the visual sensor, it is not possible to machine a workpiece by the machine tool.

Therefore, in order to increase workpiece productivity, it is necessary to reduce time spent for processes other than machining as far as possible, and it is necessary to reduce the number of times of washing the inside of the machine tool and time for checking by the visual sensor as far as possible.

Therefore, it is desired to generate a trained model that eliminates confirmation by the visual sensor during machining and prevents or reduces accumulation of chips with the possible lowest washing frequency.

Means for Solving the Problems (1) One aspect of a machine learning apparatus of the present disclosure includes: an input data acquisition unit configured to acquire input data, the input data including arbitrary machining conditions for an arbitrary machine tool to machine arbitrary workpieces, washing conditions for an arbitrary washing device to wash an inside of a machine tool where the workpieces have been machined under the machining conditions, and state information indicating a degree of soil inside the machine tool before machining under the machining conditions; a label acquisition unit configured to acquire, as label data, state information about the inside of the machine tool after performing machining under the machining conditions included in the input data and subsequent washing under the washing conditions included in the input data; and a learning unit configured to execute supervised learning using the input data acquired by the input data acquisition unit and the label data acquired by the label acquisition unit, and generate a trained model.

(2) One aspect of a washing prediction apparatus of the present disclosure includes: a trained model generated by the machine learning apparatus of (1); an input unit configured to receive, prior to machining by a machine tool, inputs of machining conditions to be applied, washing conditions for predetermined washing, current state information about an inside of the machine tool; and a prediction unit configured to input, to the trained model, the machining conditions to be applied, the washing conditions and the current state information about the inside of the machine tool received by the input unit, and predict state information about the inside of the machine tool after performing the machining under the machining conditions to be applied and subsequent washing under the washing conditions.

(3) One aspect of a washing system of the present disclosure includes: the washing prediction apparatus of (2); and a washing device.

Effects of the Invention

According to one aspect, it is possible to generate a trained model that eliminates confirmation by a visual sensor during machining and prevents accumulation of chips with the possible lowest washing frequency.

BRIEF DESCRIPTION OF THE DRAWINGS

FIG. 3 is a diagram showing an example of a trained model provided for a washing prediction apparatus of FIG. 1;

FIG. 5 is a flowchart illustrating a prediction process of a washing prediction apparatus on an operation phase;

FIG. 10 is a diagram showing an example of the configuration of the washing system.

PREFERRED MODE FOR CARRYING OUT THE INVENTION

First Embodiment

The configuration of the present embodiment will be described in detail using drawings. Here, a case will be exemplified where a washing timing at which a quantity of workpiece production is the largest is decided based on machining conditions to be applied, washing conditions for predetermined washing, and the current degree of soil inside a machine tool. As described later, the present invention is also applicable to a case where, based on the machining conditions to be applied, the washing conditions for the predetermined washing, and the current degree of soil inside the machine tool, the smallest number of times of the predetermined washing is decided for washing of the inside of the machine tool after performing machining under the machining conditions to be applied.

Figure 1:
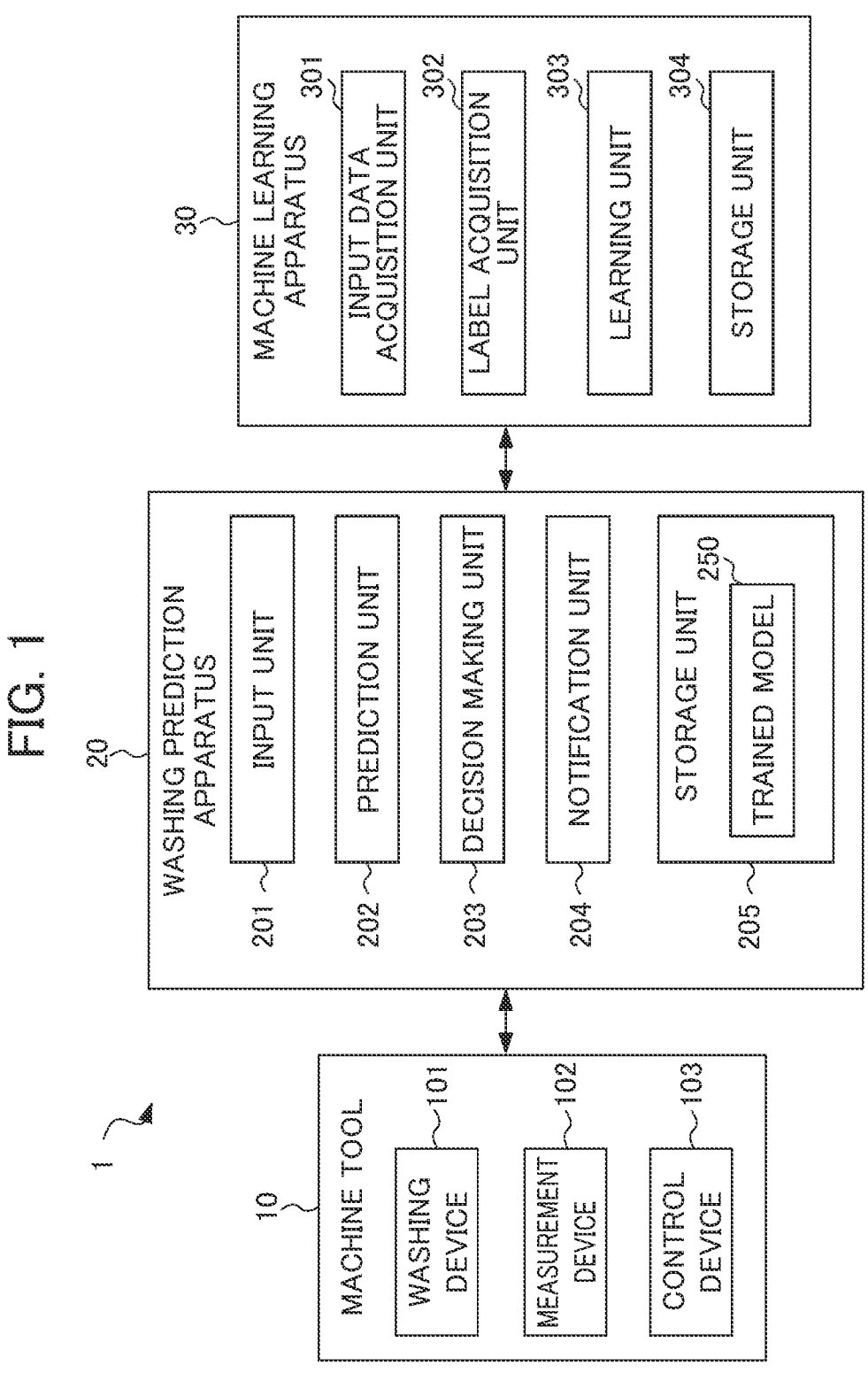
FIG. 1 is a functional block diagram showing a functional configuration example of a washing system according to a first embodiment.

FIG. 1 is a functional block diagram showing a functional configuration example of a washing system according to the first embodiment. As shown in FIG. 1, a washing system 1 has a machine tool 10, a washing prediction apparatus 20 and a machine learning apparatus 30.

The machine tool 10, the washing prediction apparatus 20, and the machine learning apparatus 30 may be mutually and directly connected via connection interfaces (not shown). Further, the machine tool 10, the washing prediction apparatus 20, and the machine learning apparatus 30 may be mutually connected via a network (not shown) such as a LAN (local area network) or the Internet. In this case, each of the machine tool 10, the washing prediction apparatus 20, and the machine learning apparatus 30 is provided with a communication unit (not shown), which is for mutually performing communication via such connection. The machine tool 10 may include the washing prediction apparatus 20 and the machine learning apparatus 30 as described later.

The machine tool 10 is a machine tool well known to one skilled in the art. The machine tool 10 incorporates a washing device 101, a measurement device 102 and a control device 103. The machine tool 10 operates based on an operation instruction of the control device 103. The washing device 101 and the control device 103 may be devices independent of the machine tool 10.

The washing device 101 is a washing device well known to one skilled in the art. For example, the washing device 101 washes the inside of the machine tool 10 by predetermined washing, by causing a pump (not shown) included in the washing device 101 to operate to inject washing liquid such as coolant from a washing nozzle (not shown) included in the washing device 101, based on a control instruction generated by the control device 103 executing a washing program.

Here, the predetermined washing is washing for which washing conditions for washing the inside of the machine tool (for example, the angle and injection amount of the washing nozzle, places inside the machine tool, a washing route, washing time, and the like) are set in advance in the washing program according to the type of the machine tool 10 and content of machining. In the washing conditions, the number of times of the predetermined washing is also set, with the predetermined washing as a basic unit.

Figure 2A:
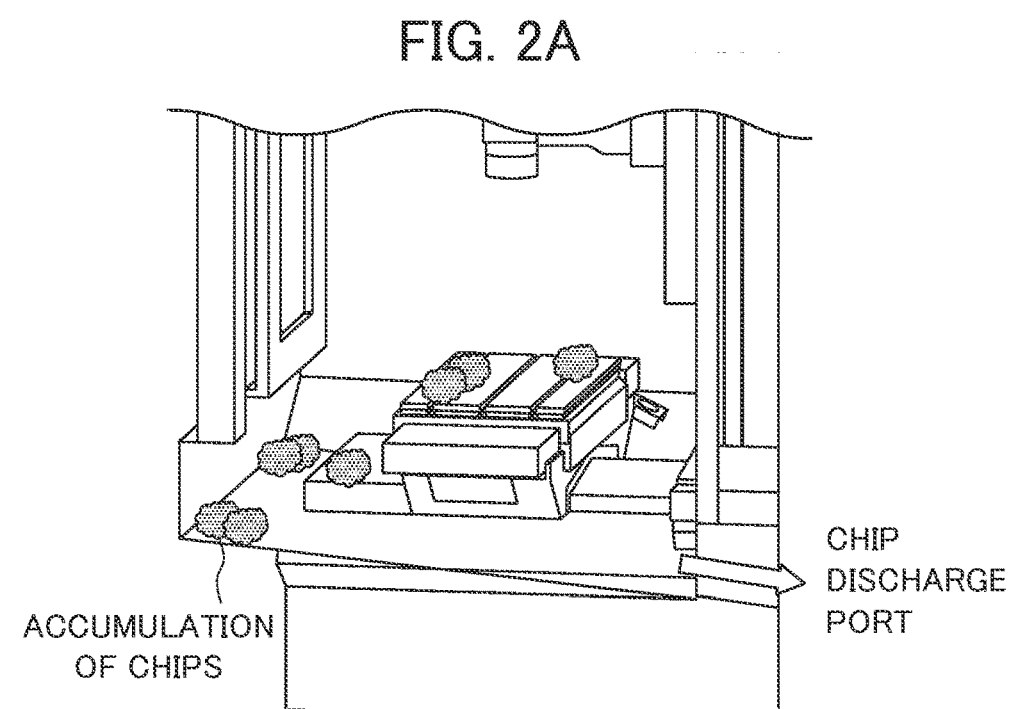
FIG. 2A is a diagram showing an example of a state of accumulation of chips seen from the side inside a machine tool.
Figure 2B:
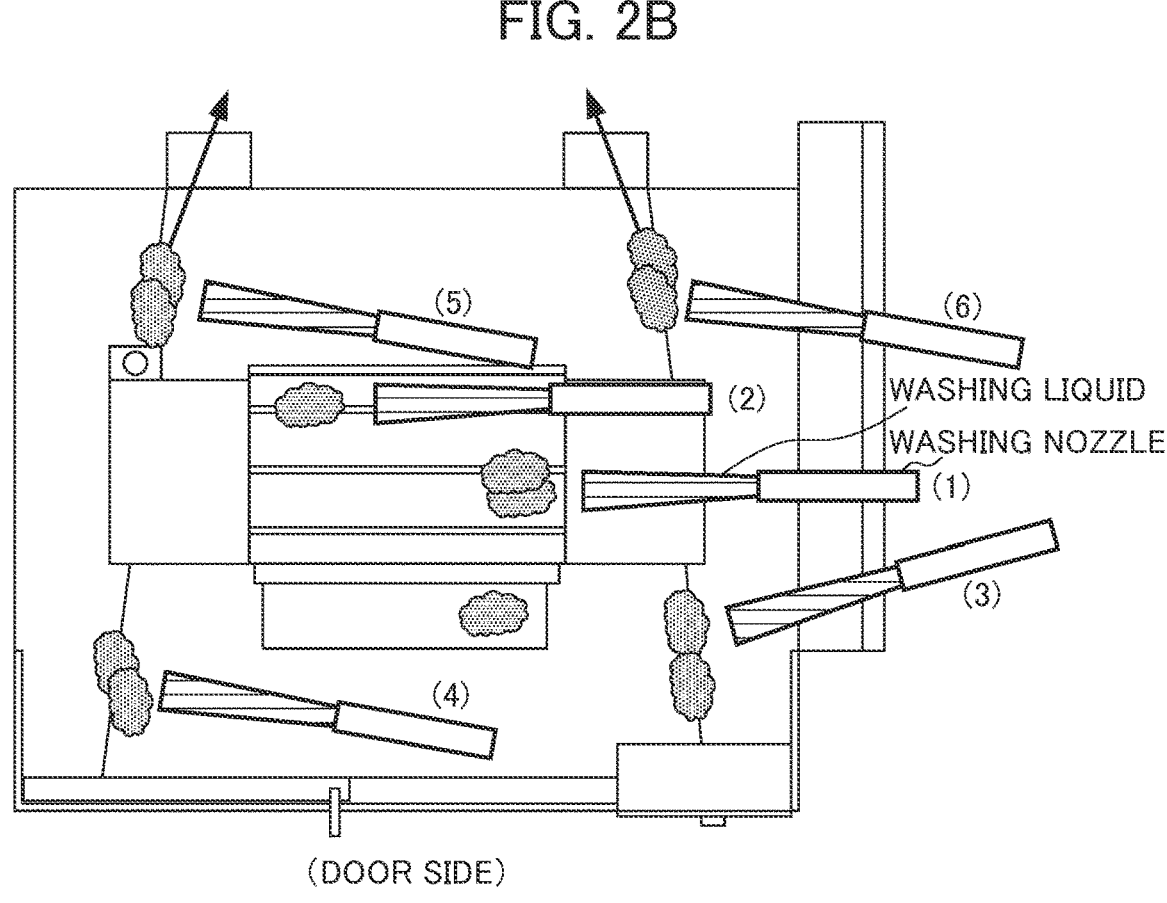
FIG. 2B is a diagram showing an example of predetermined washing seen from the top inside the machine tool.

FIG. 2A is a diagram showing an example of a state of accumulation of chips seen from the side inside the machine tool 10. FIG. 2B is a diagram showing an example of the predetermined washing seen from the top inside the machine tool 10. In FIG. 2B, the lower side corresponds to the door side of the machine tool 10.

As shown in FIG. 2B, the washing device 101 removes chips inside the machine tool 10, for example, by repeating the predetermined washing of moving the washing nozzle along a washing route from (1) to (6) the number of times included among the washing conditions based on the washing program.

The washing device 101 may be attached to or included in a robot (not shown) to wash the inside of the machine tool 10. In this case, the machine tool 10 may include a robot control device (not shown).

The measurement device 102 may measure the degree of soil inside the machine tool 10, for the entire inside of the machine tool 10 or for at least one attention point after workpieces being machined by the machine tool 10, from a predetermined position, for example. Specifically, based on a difference from a measured value for the entire inside of the machine tool 10 or for at least one attention point acquired by measuring in advance the inside of the machine tool 10 devoid of soil, the measurement device 102 may calculate an amount of the difference (the area, volume or the like) at each washing target part inside the machine tool, a rate (%) of brightness of the difference, or the like as the degree of soil inside the machine tool, using a well-known method (for example, Japanese Unexamined Patent Application, Publication No. 2018-153872 or the like). As the measurement device 102, a visual sensor, an infrared laser, an ultrasonic measuring instrument or the like can be used.

The control device 103 is a numerical control device well known to one skilled in the art. The control device 103 generates an operation instruction based on control information and transmits the generated operation instruction to the machine tool 10, the washing device 101, and the measurement device 102. Thereby, the control device 103 controls operations of the machine tool 10, the washing device 101, and the measurement device 102. The control device 103 may also output the control information to the washing prediction apparatus 20 via the communication unit of the machine tool 10 (not shown). The control information includes a machining program, the washing program and values of parameters set for the control device 103.

Further, the control device 103 may output state information indicating the current degree of soil inside the machine tool 10 measured by the measurement device 102 to the washing prediction apparatus 20 via the communication unit of the machine tool 10 (not shown).

On an operation phase, the washing prediction apparatus 20 may acquire, prior to machining of workpieces by the machine tool 10, machining conditions to be applied, washing conditions for predetermined washing, current state information about the inside of the machine tool 10, which are included in control information from the control device 103. The washing prediction apparatus 20 can predict state information about the inside of the machine tool 10 after performing machining under the machining conditions to be applied and subsequent washing under the washing conditions, by inputting the acquired machining conditions, washing conditions, and current state information about the inside of the machine tool to a trained model provided from the machine learning apparatus 30 described later.

The degree of soil inside the machine tool is mainly caused by a large quantity of chips generated by workpieces being machined by tools of the machine tool 10 and accumulated. Therefore, in consideration of the generation of chips, the machining conditions may include the type of the machine tool 10, the material of workpieces (ferrous or non-ferrous), the type of a cutting tool, the spindle speed, the feed rate, the depth of cut, and the quantity of workpiece production. The type of the cutting tool relates to the shape of chips, and the spindle speed, the feed rate, and the depth of cut relate to the quantity of chips.

Further, the state information includes the degree of soil inside the machine tool as described later.

Here, before describing the washing prediction apparatus 20, "the degree of soil inside the machine tool" and machine learning for generating a trained model will be described.

<About Degree of Soil Inside Machine Tool>

As described above, the "degree of soil inside machine tool" is an amount of difference (the area, volume or the like) at each washing target part inside the machine tool, a rate (%) of brightness of the difference, or the like calculated by the measurement device 102 based on the difference from a measured value of the entire or at least one attention point of the inside of the machine tool acquired by measuring in advance the inside of the machine tool devoid of soil. That is, the "degree of soil inside the machine tool" of the machine tool 10 immediately after washing is "0%." Then, as machining of workpieces by the machine tool 10 is repeated, the "degree of soil inside the machine tool" becomes a value corresponding to the amount of difference (the area, volume or the like) at each washing target part inside the machine tool or a rate (%) of brightness of the difference measured by the measurement device 102. The maximum allowable limit value set in advance is indicated by $\gamma$.

<Machine Learning Apparatus 30>

The machine learning apparatus 30 acquires, for example, arbitrary machining conditions for an arbitrary machine tool to machine arbitrary workpieces, washing conditions for an arbitrary washing device to wash the inside of the machine tool where the workpieces have been machined under the machining conditions, and state information indicating a degree of soil inside machine tool before machining under the machining conditions, as input data in advance.

Further, the machine learning apparatus 30 acquires, as a label (a correct answer), state information about the inside of the machine tool (a degree of soil inside the machine tool) after performing machining under the machining conditions included in the acquired input data and subsequent washing under the washing conditions included in the acquired input data.

The machine learning apparatus 30 performs supervised learning with training data of a pair of the acquired input data and label to construct a trained model described later.

By doing so, the machine learning apparatus 30 can provide the constructed trained model for the washing prediction apparatus 20.

The machine learning apparatus 30 will be specifically described.

As shown in FIG. 1, the machine learning apparatus 30 has an input data acquisition unit 301, a label acquisition unit 302, a learning unit 303, and a storage unit 304.

On a learning phase, the input data acquisition unit 301 acquires arbitrary machining conditions for an arbitrary machine tool to machine arbitrary workpieces, washing conditions for an arbitrary washing device to wash the inside of the machine tool where the workpieces have been machined under the machining conditions, and state information indicating a degree of soil inside the machine tool before machining under the machining conditions from the control device 103 or the like, as input data via the communication unit (not shown). The input data acquisition unit 301 outputs the acquired input data to the storage unit 304.

The label acquisition unit 302 acquires, as label data (correct answer data), data indicating a degree of soil inside the machine tool after performing machining under the machining conditions included in the input data and subsequent washing under the washing conditions included in the input data and outputs the acquired label data to the storage unit 304.

By accepting the pair of the input data and the label described above as training data and performing supervised learning using the accepted training data, the learning unit 303 constructs a trained model 250 for predicting the degree of soil inside the machine tool after performing machining under the machining conditions to be applied and subsequent washing under the washing conditions (for example, the number of times of the predetermined washing), based on the machining conditions to be applied, the washing conditions, and the current degree of soil inside the machine tool.

Then, the learning unit 303 provides the constructed trained model 250 for the washing prediction apparatus 20.

As for the training data for performing supervised learning, it is desirable that many pieces of training data are prepared. For example, the training data may be acquired from each of the control devices 103 of the machine tools 10 that are actually operating in various places such as clients' factories and the like.

FIG. 3 is a diagram showing an example of the trained model 250 provided for the washing prediction apparatus 20 of FIG. 1. Here, as illustrated in FIG. 3, the trained model 250 illustrates a multi-layer neural network in which machining conditions to be applied, such as the type of the machine tool and the material of workpieces, a washing condition for the number of times of predetermined washing, and state information about the current degree of soil inside the machine tool are used as an input layer, and data indicating the "degree of soil" inside the machine tool after performing machining under the machining conditions to be applied and subsequent washing under the washing condition are used as an output layer.

Here, the machining conditions to be applied include the type of the machine tool, the material of the workpieces (ferrous or non-ferrous), the type of the cutting tool, the spindle speed, the feed rate, the depth of cut, and the quantity of workpiece production as described above.

Though the number of times of the predetermined washing is assumed as the washing condition, washing time (=(washing time for predetermined washing) x (the number of times of washing)) is also possible.

If acquiring new training data after constructing the trained model 250, the learning unit 303 may update the trained model 250 constructed once by further performing supervised learning for the trained model 250.

The supervised learning described above may be performed by online learning, batch learning, or mini-batch learning.

The online learning is a learning method in which, each time machining of a workpiece by the machine tool 10 and creation of training data is performed, supervised learning is immediately performed. The batch learning is a learning method in which, while machining of a workpiece by the machine tool 10 and creation of training data are repeated, a plurality of pieces of training data corresponding to the repetitions are collected, and supervised learning is performed using all the collected pieces of training data. The mini-batch learning is an intermediate learning method between the online learning and the batch learning, in which supervised learning is performed each time some pieces of training data have been collected.

The storage unit 304 is a RAM (random access memory) or the like and stores the input data acquired by the input data acquisition unit 301, the label data acquired by the label acquisition unit 302, the trained model 250 constructed by the learning unit 303, and the like.

The machine learning for generating the trained model 250 provided in the washing prediction apparatus 20 has been described above.

Next, the washing prediction apparatus 20 on the operation phase will be described.

<Washing Prediction Apparatus 20 on Operation Phase>

As shown in FIG. 1, the washing prediction apparatus 20 on the operation phase is configured including an input unit 201, a prediction unit 202, a decision making unit 203, a notification unit 204, and a storage unit 205.

The washing prediction apparatus 20 is provided with an arithmetic processing device (not shown), such as a CPU (central processing unit), in order to realize operations of the functional blocks of FIG. 1. Further, the washing prediction apparatus 20 is provided with auxiliary storage devices (not shown), such as a ROM (read-only memory) and an HDD, in which various kinds of control programs are stored, and a main memory (not shown), such as a RAM, for storing data that is temporarily required for the arithmetic processing device to execute a program.

In the washing prediction apparatus 20, the arithmetic processing device reads an OS and application software from the auxiliary storage devices, and, while developing the read OS and application software on the main memory, performs arithmetic processing based on the OS and the application software. Based on a result of the arithmetic processing, the washing prediction apparatus 20 controls each piece of hardware. Thereby, processes by the functional blocks of FIG. 1 are realized. That is, the washing prediction apparatus 20 can be realized by cooperation by the hardware and the software.

The input unit 201 receives, prior to the machining of workpieces by the machine tool 10, inputs of machining conditions to be applied, a washing condition for the number of times of predetermined washing, and state information about the current degree of soil inside the machine tool, for example, from control information of the control device 103. The input unit 201 outputs the acquired machining conditions to be applied, washing condition for the number of times of the predetermined washing, and state information about the current degree of soil inside the machine tool, to the prediction unit 202.

The prediction unit 202 inputs the machining conditions to be applied, the washing condition for the number of times of the predetermined washing, and the state information about the current degree of soil inside the machine tool to the trained model 250 of FIG. 3, and predicts state information about the "degree of soil" inside the machine tool after performing machining under the machining conditions to be applied and subsequent washing under the washing condition.

The number of times of the predetermined washing in the washing condition is set to "0" so that the washing timing at which the quantity of workpiece production is the largest is decided by the decision making unit 203 described later. That is, the prediction unit 202 predicts the degree of soil inside the machine tool immediately before a washing timing at which it becomes necessary to wash the inside of the machine tool.

The decision making unit 203 decides the washing timing at which the quantity of workpiece production is the largest, based on the state information about the degree of soil inside the machine tool predicted by the prediction unit 202.

Specifically, the decision making unit 203 judges whether it is the washing timing at which washing of the inside of the machine tool is necessary or not, based on comparison between a predicted value of the degree of soil inside the machine tool and a preset threshold.

Figure 4:
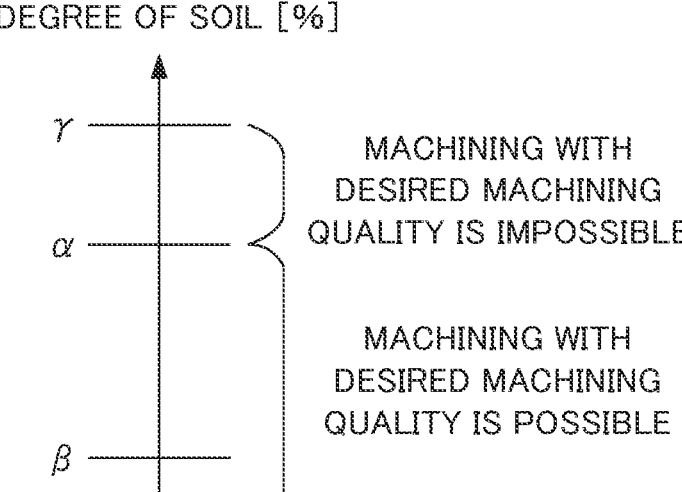
FIG. 4 is a diagram showing an example of degrees of soil inside the machine tool.

FIG. 4 is a diagram showing an example of degrees of soil inside the machine tool. As shown in FIG. 4, for example, the degree of soil inside the machine tool is "0%" immediately after washing, and the degree of soil increases by machining of a workpiece is repeated by the machine tool 10. For example, if the degree of soil inside the machine tool is below a predetermined rate $\alpha$, the machine tool 10 can machine a workpiece with desired machining quality. On the other hand, if the degree of soil is equal to or above the predetermined rate $\alpha$, the machine tool 10 cannot machine a workpiece with the desired machining quality.

In the description below, the predetermined rate $\alpha$, which is a degree of soil inside the machine tool, is defined as the threshold. The predetermined rate $\alpha$ (hereinafter, also referred to as the "threshold $\alpha$") may be appropriately set according to the environment of a factory where the machine tool 10 is installed, content of machining by the machine tool 10, and the like.

As described later, if the degree of soil inside the machine tool is below a predetermined rate $\beta$, it can be considered that there is no chip inside the machine tool, and the predetermined rate $\beta$, which is the degree of soil inside the machine tool, is defined as a threshold indicating a state in which washing of the inside of the machine tool is unnecessary, and there is no chip. Here, $\gamma > \alpha > \beta$ is assumed.

The decision making unit 203 judges whether the degree of soil inside the machine tool predicted by the prediction unit 202 is below the threshold a or not. For example, if the predicted degree of soil inside the machine tool is below the threshold $\alpha$, the decision making unit 203 increments the quantity of workpiece production among the machining conditions to be applied by one (a predetermined number), causes the prediction unit 202 to predict the degree of soil inside the machine tool after performing machining under the machining conditions to be applied, among which the number of produced workpieces has been incremented, and performing washing under the washing condition, and decides the washing timing at which the number of produced workpieces is the largest within a range that the predicted degree of soil inside the machine tool is below the threshold $\alpha$.

On the other hand, if the predicted degree of soil inside the machine tool is equal to or above the threshold $\alpha$, the decision making unit 203 decrements the quantity of workpiece production among the machining conditions to be applied by one (a predetermined number), causes the prediction unit 202 to predict the degree of soil inside the machine tool after performing machining under the machining conditions to be applied, among which the number of produced workpieces has been decremented, and performing washing under the washing condition, and decides the washing timing at which the number of produced workpieces is the largest within the range that the predicted degree of soil inside the machine tool is below the threshold $\alpha$.

The notification unit 204 may output the washing timing at which the quantity of workpiece production is the largest, which has been decided by the decision making unit 203, to an output device (not shown) such as a liquid crystal display included in the machine tool 10 and/or the control device 103.

By doing so, the notification unit 204 can recommend the washing timing at which the quantity of workpiece production is the largest, which has been decided by the decision making unit 203, to a user (an operator). The notification unit 204 may make a notification by voice via a speaker (not shown).

The storage unit 205 is a ROM, an HDD or the like and may store the trained model 250 together with the various kinds of control programs.

<Prediction Process of Washing Prediction Apparatus 20 on Operation Phase>

Next, operation related to a prediction process of the washing prediction apparatus 20 according to the present embodiment will be described.

FIG. 5 is a flowchart illustrating the prediction process of the washing prediction apparatus 20 on the operation phase.

At Step S11, prior to machining of workpieces by the machine tool 10, the input unit 201 receives inputs of machining conditions to be applied, a washing condition of the number of times of predetermined washing "0", and state information about the current degree of soil inside the machine tool, from control information of the control device 103.

At Step S12, the prediction unit 202 inputs the machining conditions to be applied, the washing condition of the number of times of the predetermined washing "0", and the state information about the current degree of soil inside the machine tool to the trained model 250, and predicts state information about the "degree of soil" inside the machine tool after performing machining under the machining conditions to be applied and subsequent washing under the washing condition.

At Step S13, the decision making unit 203 decides the washing timing at which the quantity of workpiece production is the largest, within the range that a predicted value of the degree of soil inside the machine tool, which has been predicted at Step S12, is below the threshold $\alpha$. For example, if the predicted degree of soil inside the machine tool is below the threshold $\alpha$, the decision making unit 203 increments the quantity of workpiece production among the machining conditions to be applied by one (a predetermined number), causes the prediction unit 202 to predict the degree of soil inside the machine tool after performing machining under the machining conditions to be applied, among which the number of produced workpieces has been incremented, and performing washing under the washing condition, and decides the washing timing at which the number of produced workpieces is the largest within the range that the predicted degree of soil inside the machine tool is below the threshold $\alpha$.

On the other hand, if the predicted degree of soil inside the machine tool is equal to or above the threshold $\alpha$, the decision making unit 203 decrements the quantity of workpiece production among the machining conditions to be applied by one (a predetermined number), causes the prediction unit 202 to predict the degree of soil inside the machine tool after performing machining under the machining conditions to be applied, among which the number of produced workpieces has been decremented, and performing washing under the washing condition, and decides the washing timing at which the number of produced workpieces is the largest within the range that the predicted degree of soil inside the machine tool is lower than the threshold $\alpha$.

At Step S14, the notification unit 204 notifies the washing timing at which the quantity of workpiece production is the largest, which has been decided by Step S13.

According to the above, prior to machining of workpieces by the machine tool 10, the washing prediction apparatus 20 according to the first embodiment inputs machining conditions to be applied, which is related to the machining, a washing condition of the number of times of predetermined washing, and state information including the current degree of soil inside the machine tool to the trained model 250 to predict state information about the degree of soil inside the machine tool after performing the machining and the washing. Then, the washing prediction apparatus 20 decides the washing timing at which the quantity of workpiece production is the largest, based on comparison between a predicted value of the predicted degree of soil inside the machine tool and a threshold.

Thereby, the washing prediction apparatus 20 can eliminate confirmation by a visual sensor during machining and prevent accumulation of chips with the possible lowest washing frequency.

Further, the washing prediction apparatus 20 eliminates the necessity for a worker to judge the necessity of washing the inside of the machine tool by using the trained model 250, and it is possible to reduce the burden on the worker.

The first embodiment has been described above.

Second Embodiment

Next, a second embodiment will be described. As described above, the washing prediction apparatus 20 according to the first embodiment decides the washing timing at which the quantity of workpiece production is the largest, based on machining conditions to be applied, a washing condition for predetermined washing, and the current degree of soil inside the machine tool. In comparison, a washing prediction apparatus 20a according to the second embodiment is different from the first embodiment in that, based on the machining conditions to be applied, washing conditions for the predetermined washing, and the current degree of soil inside the machine tool, the smallest number of times of the predetermined washing is decided, for washing of the inside of the machine tool after performing machining under the machining conditions to be applied. It is assumed that a predicted value of the degree of soil inside the machine tool after performing machining under the machining conditions is below the threshold $\alpha$. By making it a machining condition that the quantity of workpiece production is the largest within the range that the degree of soil inside the machine tool is below the threshold $\alpha$, it is possible to decide the smallest number of times of the predetermined washing, for washing of the inside of the machine tool at the washing timing at which the quantity of workpiece production is the largest.

Thereby, the washing prediction apparatus 20a according to the second embodiment can eliminate confirmation by a visual sensor during machining and prevent accumulation of chips with the possible lowest washing frequency.

The second embodiment will be described below.

Figure 6:
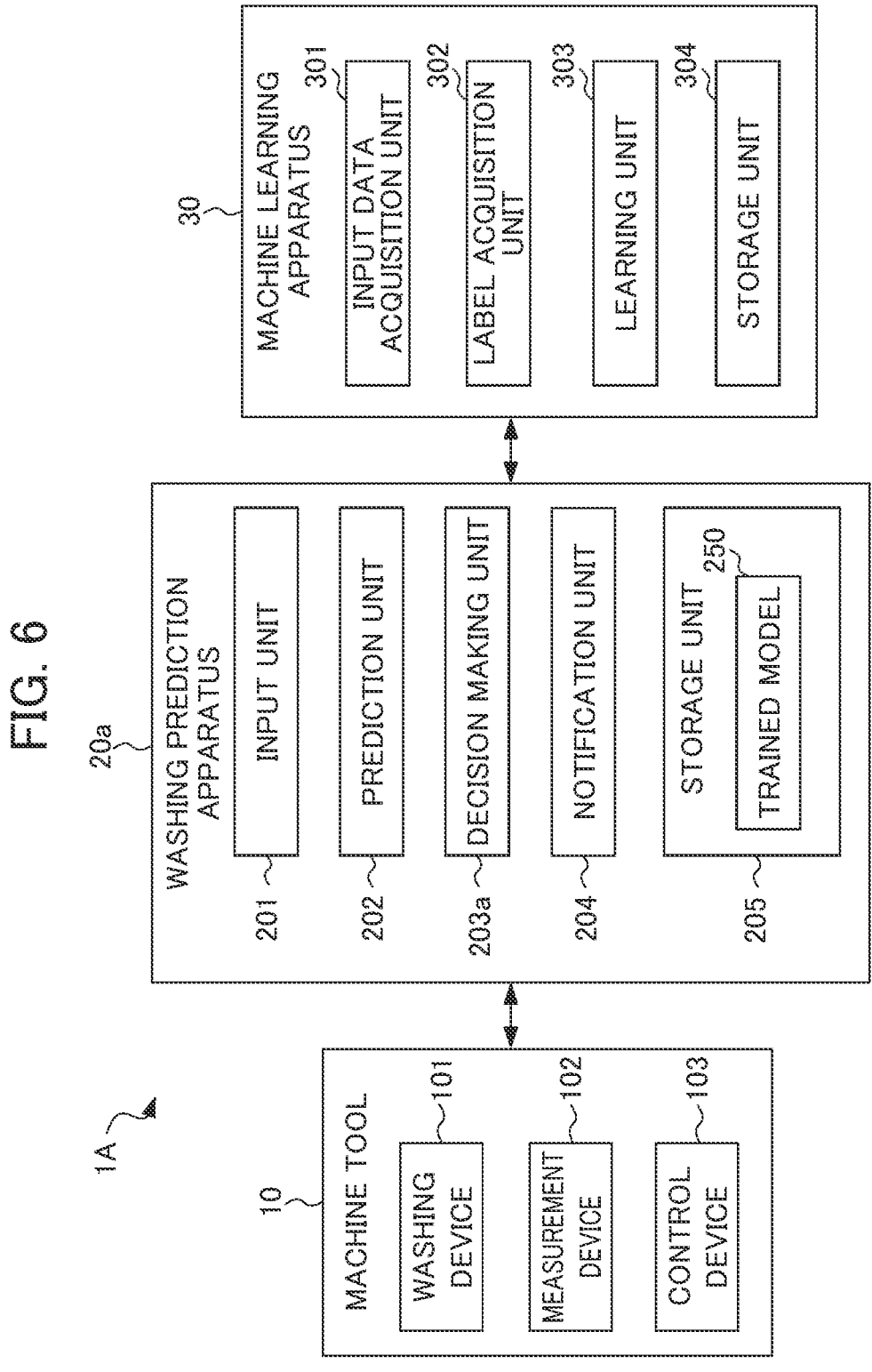
FIG. 6 is a functional block diagram showing a functional configuration example of a washing system according to a second embodiment.

FIG. 6 is a functional block diagram showing a functional configuration example of a washing system according to the second embodiment. As for components having functions similar to functions of components of the washing system 1 of FIG. 1, the same reference signs will be given, and detailed description of the components will be omitted.

As shown in FIG. 6, a washing system 1A has the machine tool 10, a washing prediction apparatus 20a and the machine learning apparatus 30.

The machine tool 10 includes the washing device 101, the measurement device 102, and the control device 103.

The washing device 101, the measurement device 102, and the control device 103 have functions similar to the functions of the washing device 101, the measurement device 102, and the control device 103 according to the first embodiment.

The machine learning apparatus 30 includes the input data acquisition unit 301, the label acquisition unit 302, the learning unit 303, and the storage unit 304.

The input data acquisition unit 301, the label acquisition unit 302, the learning unit 303, and the storage unit 304 have functions similar to the functions of the input data acquisition unit 301, the label acquisition unit 302, the learning unit 303, and the storage unit 304 according to the first embodiment.

The washing prediction apparatus 20a includes the input unit 201, the prediction unit 202, a decision making unit 203a, the notification unit 204, and the storage unit 205.

The input unit 201, the prediction unit 202, the notification unit 204, and the storage unit 205 have functions similar to the functions of the input unit 201, the prediction unit 202, the notification unit 204, and the storage unit 205 according to the first embodiment.

The decision making unit 203a decides the smallest number of times of predetermined washing, for washing of the inside of the machine tool after performing machining under the machining conditions to be applied, based on state information about the degree of soil inside the machine tool after performing machining and washing, which has been predicted by the prediction unit 202.

Specifically, the decision making unit 203a judges whether there are chips inside the machine tool or not, based on comparison between a predicted value of the degree of soil inside the machine tool and a preset threshold β, the threshold β indicating that there is no chip inside the machine tool. If the degree of soil inside the machine tool predicted by the prediction unit 202 is equal to or above the threshold β, the decision making unit 203a judges that there are chips inside the machine tool. In this case, for example, the decision making unit 203a increments the number of times of the predetermined washing among the inputted washing conditions by one (a predetermined number) so that the predicted degree of soil inside the machine tool becomes below the threshold β, causes the prediction unit 202 to predict the degree of soil inside the machine tool under the washing conditions among which the number of times of the predetermined washing has been incremented, and decides the smallest number of times of the predetermined washing, for washing of the inside of the machine tool after performing machining under the machining conditions to be applied, within a range that the predicted degree of soil inside the machine tool is below the threshold β.

On the other hand, if the degree of soil inside the machine tool predicted by the prediction unit 202 is below the threshold β, the decision making unit 203a judges that there is no chip inside the machine tool. In this case, for example, the decision making unit 203a decrements the number of times of the predetermined washing among the inputted washing conditions by one (a predetermined number), causes the prediction unit 202 to predict the degree of soil inside the machine tool under the washing conditions among which the number of times of the predetermined washing has been decremented, and decides the smallest number of times of the predetermined washing, for washing of the inside of machine tool after performing machining under the machining conditions to be applied, within a range that the predicted degree of soil inside the machine tool is below the threshold β.

<Prediction Process of Washing Prediction Apparatus 20a on Operation Phase>

Next, operation related to the prediction process of the washing prediction apparatus 20a according to the present embodiment will be described.

Figure 7:
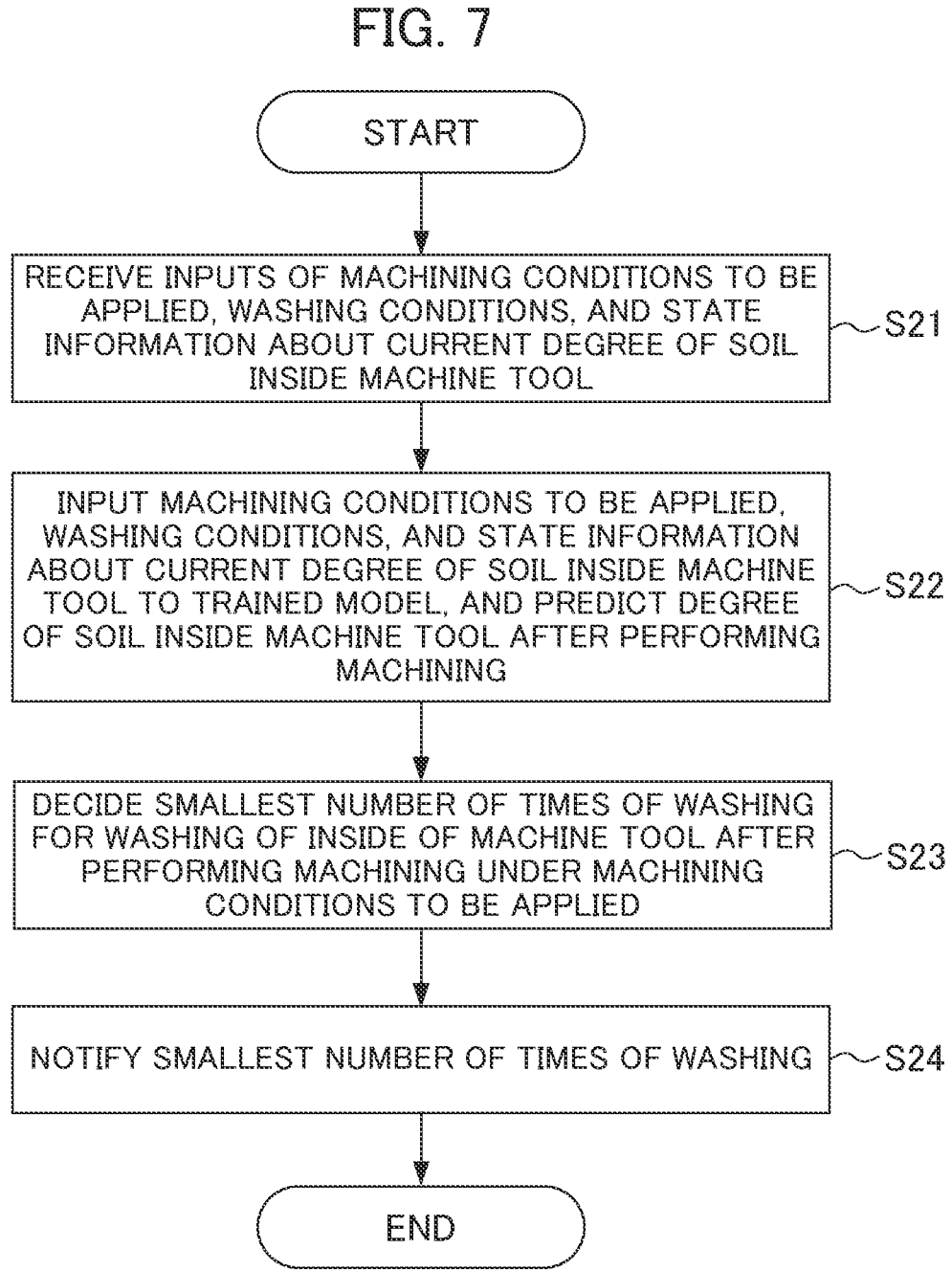
FIG. 7 is a flowchart illustrating a prediction process of a washing prediction apparatus on an operation phase.

FIG. 7 is a flowchart illustrating the prediction process of the washing prediction apparatus 20a on an operation phase.

At Step S21, prior to machining of workpieces by the machine tool 10, the input unit 201 receives inputs of machining conditions to be applied, a washing condition for the number of times of predetermined washing, and state information about the current degree of soil inside the machine tool, from control information of the control device 103.

At Step S22, the prediction unit 202 inputs the machining conditions to be applied, the washing condition for the number of times of the predetermined washing, and the state information about the current degree of soil inside the machine tool to the trained model 250, and predicts state information about the "degree of soil" inside the machine tool after performing machining under the machining conditions to be applied and subsequent washing under the washing condition.

At Step S23, the decision making unit 203a decides the smallest number of times of the predetermined washing, for washing of the inside of the machine tool after performing machining under the machining conditions to be applied, within the range that a predicted value of the degree of soil inside the machine tool predicted at Step S22 is below the threshold β. For example, the decision making unit 203a increments the number of times of the predetermined washing among the washing conditions inputted at Step S21 by one (a predetermined number), causes the prediction unit 202 to predict the degree of soil inside the machine tool under the washing conditions among which the number of times of the predetermined washing has been incremented, and decides the smallest number of times of the predetermined washing, for washing of the inside of the machine tool after performing machining under the machining conditions to be applied, within the range that the predicted degree of soil inside the machine tool is below the threshold β. On the other hand, if the degree of soil inside the machine tool predicted by the prediction unit 202 is below the threshold β, the decision making unit 203a decrements the number of times of the predetermined washing among the inputted washing conditions by one (a predetermined number), causes the prediction unit 202 to predict the degree of soil inside the machine tool under the washing conditions among which the number of times of the predetermined washing has been decremented, and decides the smallest number of times of the predetermined washing, for washing of the inside of the machine tool after performing machining under the machining conditions to be applied, within the range that the predicted degree of soil inside the machine tool is below the threshold β.

At Step S24, the notification unit 204 notifies the smallest number of times of the predetermined washing decided at Step S23.

According to the above, prior to machining of workpieces by the machine tool 10, the washing prediction apparatus 20a according to the second embodiment inputs machining conditions to be applied, which is related to the machining, a washing condition for the number of times of predetermined washing, and state information including the current degree of soil inside the machine tool to the trained model 250 to predict state information about the degree of soil inside the machine tool after performing machining and washing. Then, the washing prediction apparatus 20a decides the smallest number of times of the predetermined washing, for washing of the inside of the machine tool after performing machining under the machining conditions to be applied, based on comparison between a predicted value of the predicted degree of soil inside the machine tool and the threshold.

Thereby, the washing prediction apparatus 20a can eliminate confirmation by a visual sensor during machining and prevent accumulation of chips with the possible lowest washing frequency.

Further, the washing prediction apparatus 20a eliminates the necessity for a worker to judge the necessity of washing the inside of the machine tool by using the trained model 250, and it is possible to reduce the burden on the worker.

The second embodiment has been described above.

The first and second embodiments have been described above. The washing prediction apparatuses 20 and 20a and the machine learning apparatus 30, however, are not limited to the above embodiments, and modifications, improvements and the like within a range that the object can be achieved are included.

Modification Example 1

In the above first and second embodiments, the machine learning apparatus 30 is exemplified as an apparatus different from the machine tool 10, the control device 103, and the washing prediction apparatuses 20 and 20a. A part or all of the functions of the machine learning apparatus 30, however, may be provided for the machine tool 10, the control device 103, or each of the washing prediction apparatuses 20 and 20a.

Modification Example 2

For example, in the above first and second embodiments, the washing prediction apparatuses 20 and 20a are exemplified as apparatuses different from the machine tool 10 and the control device 103. A part or all of the functions of the washing prediction apparatus 20 or 20a, however, may be provided for the machine tool 10 or the control device 103.

Or alternatively, a part or all of the input unit 201, the prediction unit 202, the decision making unit 203, the notification unit 204 and the storage unit 205 of the washing prediction apparatus 20 may be provided for a server, for example. Further, a part or all of the input unit 201, the prediction unit 202, the decision making unit 203a, the notification unit 204 and the storage unit 205 of the washing prediction apparatus 20a may be provided for a server, for example. Further, each function of the washing prediction apparatuses 20 and 20a may be realized using a virtual server function or the like on a cloud.

Furthermore, the washing prediction apparatuses 20 and 20a may be distributed processing systems in which the functions of the washing prediction apparatuses 20 and 20a are appropriately distributed in a plurality of servers.

Modification Example 3

For example, in the above second embodiment, the control device 103 sets the same content for the predetermined washing each time in the washing program as shown in FIG. 2B, and causes the washing device 101 to perform the predetermined washing the number of times of washing. However, there is no limitation thereto. For example, since chips inside the machine tool 10 decrease as the number of times of washing increases, the control device 103 may change the content of the predetermined washing each time of washing in the washing program.

Figure 8A:
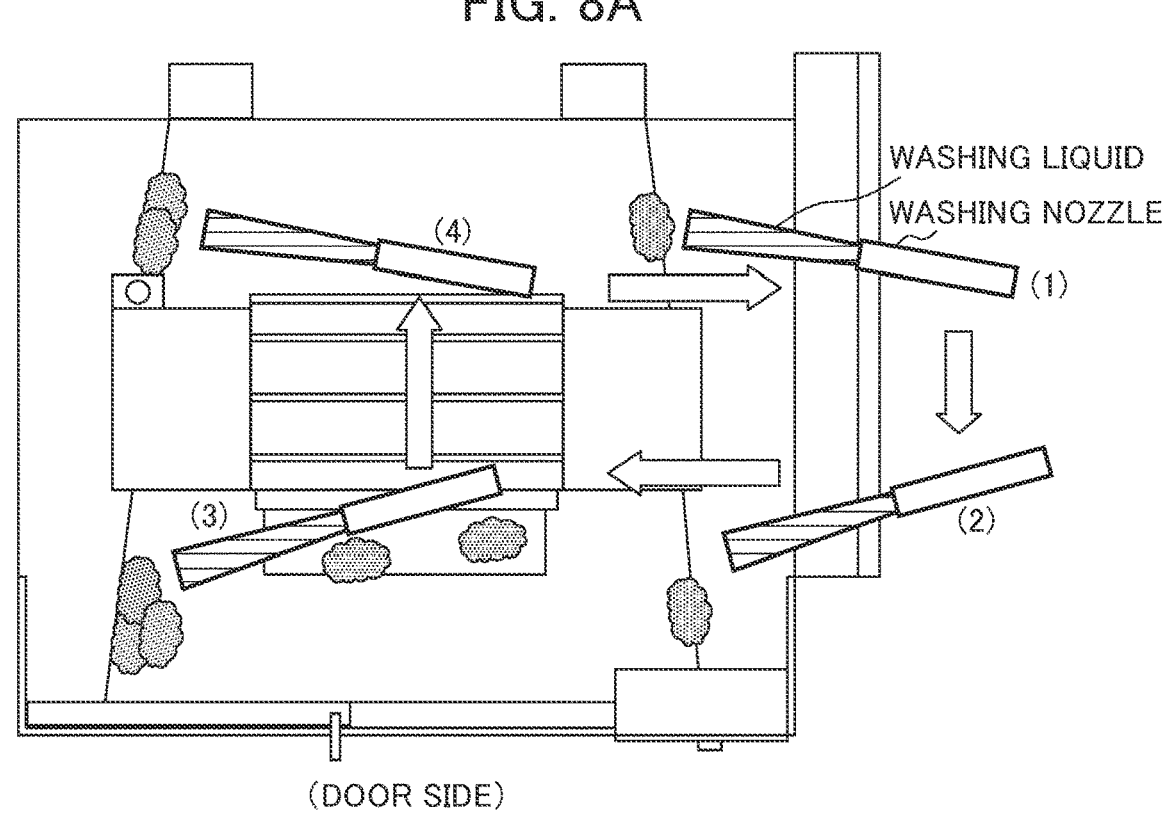
FIG. 8A is a diagram showing an example of the first predetermined washing.
Figure 8B:
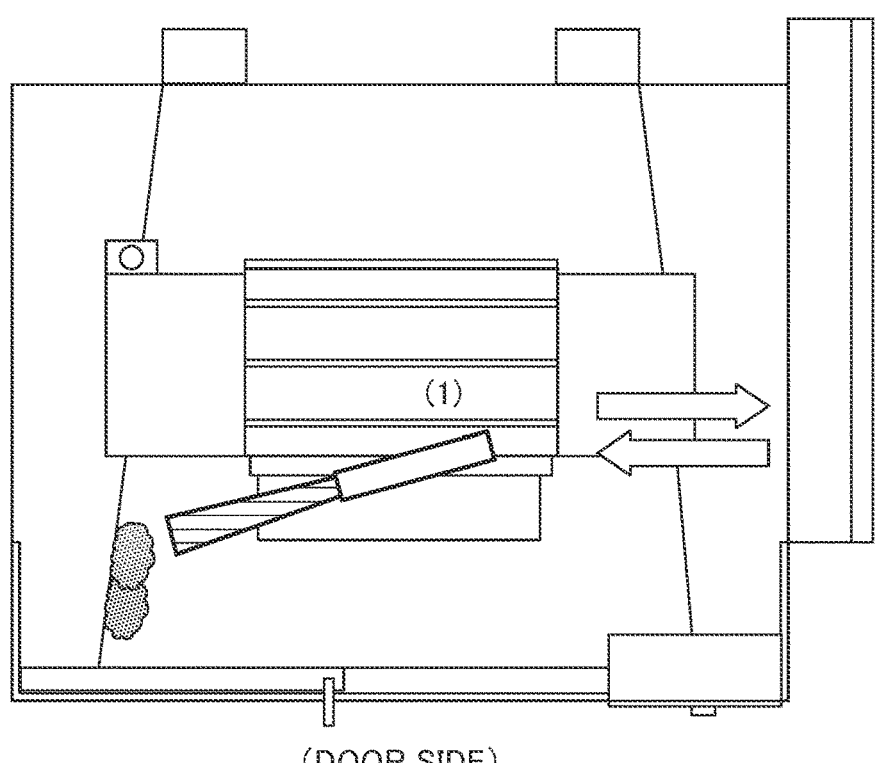
FIG. 8B is a diagram showing an example of the second predetermined washing.

FIG. 8A is a diagram showing an example of the first predetermined washing. FIG. 8B is a diagram showing an example of the second predetermined washing.

As shown in FIG. 8A, the control device 103 performs predetermined washing of moving the washing nozzle of the washing device 101 along a washing route from (1) to (4) based on the washing program to remove chips inside the machine tool. The control device 103 causes the measurement device 102 to make a measurement of the inside of the machine tool after the first predetermined washing. For example, if chips remain only at a lower left position inside the machine tool as shown in FIG. 8B, based on a measurement result of the measurement device 102, then the control device 103 may set a washing route for removing only the chips at the position for the washing program, for the second predetermined washing.

By doing so, the washing prediction apparatus 20a can shorten washing time more.

Modification Example 4

Figure 9:
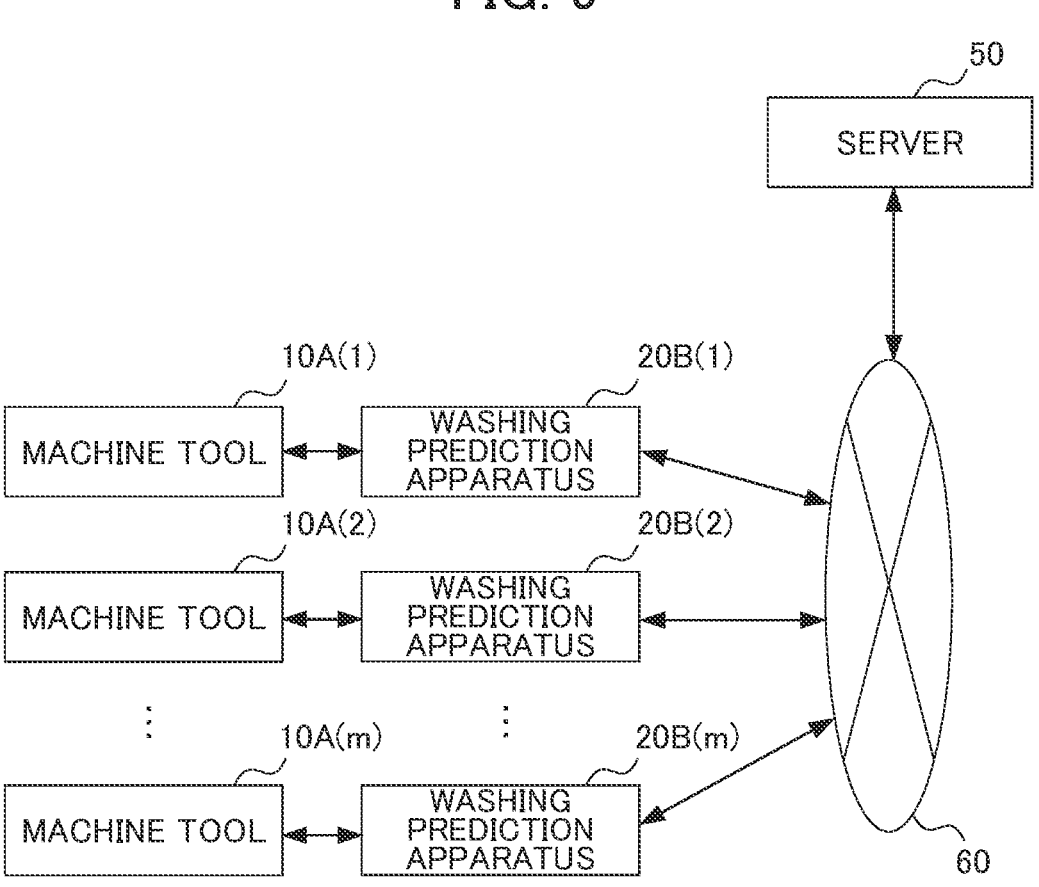
FIG. 9 is a diagram showing an example of the configuration of the washing system.

For example, in the above first and second embodiments, the washing prediction apparatuses 20 and 20a predict the degree of soil inside the machine tool after performing machining under machining conditions to be applied and subsequent washing under washing conditions, the machining and washing conditions having been acquired from one machine tool 10, using the trained model 250 provided from the machine learning apparatus 30. However, there is no limitation thereto. For example, as shown in FIG. 9, a server 50 may store the trained model 250 generated by the machine learning apparatus 30 and share the trained model 250 with m washing prediction apparatuses 20B(1) to 20B(m) connected to a network 60 (m is an integer equal to or larger than 2). Thereby, even when a new machine tool or a new washing prediction apparatus is arranged, the trained model 250 can be applied.

Each of the washing prediction apparatuses 20B(1) to 20B(m) are connected to machine tools 10A(1) to 10A(m), respectively.

Each of the machine tools 10A(1) to 10A(m) corresponds to the machine tool 10 of FIG. 1. Each of the washing prediction apparatuses 20B(1) to 20B(m) corresponds to the washing prediction apparatus 20 of FIG. 1 or the washing prediction apparatus 20a of FIG. 6.

Figure 10:
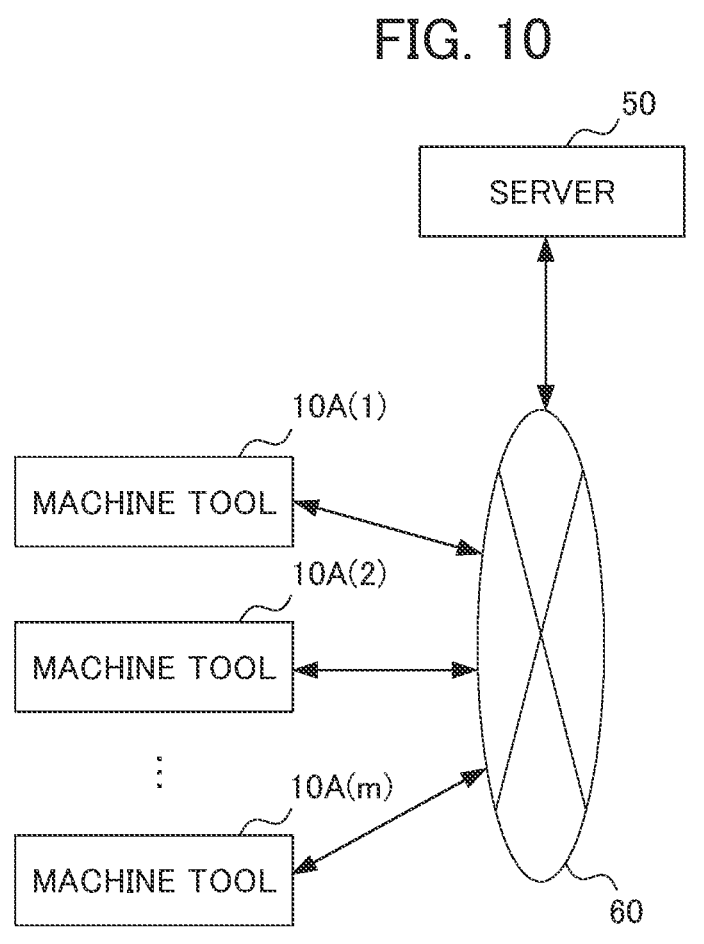

Alternatively, as shown in FIG. 10, the server 50 may operate, for example, as the washing prediction apparatus 20 or 20a and predict, for each of the machine tools 10A(1) to 10A(m) connected to the network 60, the degree of soil inside the machine tool after performing machining under the machining conditions to be applied and subsequent washing under the washing conditions. Thereby, even when a new machine tool is arranged, the trained model 250 can be applied.

Each of the functions included in the washing prediction apparatuses 20 and 20a and the machine learning apparatus 30 in the first and second embodiments can be realized by hardware, software, or a combination thereof. Here, being realized by software means being realized by a computer reading and executing a program.

Each of the components included in the washing prediction apparatuses 20 and 20a and the machine learning apparatus 30 can be realized by hardware including an electronic circuit and the like, software, or a combination thereof. In the case of being realized by software, a program constituting the software is installed into a computer. The program may be recorded in a removable medium and distributed to a user or may be distributed by being downloaded to the user's computer via a network. In the case of being configured with hardware, a part or all of functions of each component included in the above apparatuses can be configured with an integrated circuit (IC), for example, an ASIC (application specific integrated circuit), a gate array, an FPGA (field programmable gate array), or a CPLD (complex programmable logic device).

The program can be supplied to the computer by using any of various types of non-transitory computer-readable media in which the program is stored. The non-transitory computer-readable media include various types of tangible storage media. Examples of the non-transitory computer-readable media include a magnetic recording medium (for example, a flexible disk, a magnetic tape, or a hard disk drive), a magneto-optical recording medium (for example, a magneto-optical disk), a CD-ROM (read-only memory), a CD-R, a CD-R/W, a semiconductor memory (for example, a mask ROM and a PROM (programmable ROM), an EPROM (Erasable PROM), a flash ROM and a RAM). The program may be supplied to the computer by any of various types of transitory computer-readable media. Examples of the transitory computer-readable media include an electrical signal, an optical signal and an electromagnetic wave. The transitory computer-readable media can supply the program to the computer via a wired communication path such as an electrical wire and an optical fiber, or a wireless communication path.

Steps describing the program recorded in a recording medium include not only processes that are performed chronologically in that order but also processes that are not necessarily chronologically performed but are executed in parallel or individually.

In other words, the machine learning apparatus, washing prediction apparatus, and washing system of the present disclosure can take various embodiments having the following configurations.

(1) The machine learning apparatus 30 of the present disclosure includes: the input data acquisition unit 301 configured to acquire input data, the input data including arbitrary machining conditions for an arbitrary machine tool to machine arbitrary workpieces, washing conditions for an arbitrary washing device to wash an inside of the machine tool where the workpieces have been machined under the machining conditions, and state information indicating a degree of soil inside the machine tool before machining under the machining conditions; the label acquisition unit 302 configured to acquire, as label data, state information about the inside of the machine tool after performing machining under the machining conditions included in the input data and subsequent washing under the washing conditions included in the input data, and the learning unit 303 configured to execute supervised learning using the input data acquired by the input data acquisition unit 301 and the label data acquired by the label acquisition unit 302, and generate the trained model 250.

According to the machine learning apparatus 30, it is possible to generate a trained model that eliminates confirmation by a visual sensor during machining and prevents accumulation of chips with the possible lowest washing frequency.

(2) In the machine learning apparatus 30 according to (1), the machining conditions may include at least a type of the machine tool, material of the workpieces, a type of a cutting tool, a spindle speed, a feed rate, a depth of cut, and the quantity of workpiece production indicating the number of workpieces to be machined; and the washing conditions may include at least the number of times of predetermined washing.

By doing so, the machine learning apparatus 30 can generate the trained model 250 capable of accurately predicting the degree of soil inside the machine tool 10.

(3) The washing prediction apparatus 20 of the present disclosure includes: the trained model 250 generated by the machine learning apparatus 30 according to (1) or (2); the input unit 201 configured to receive, prior to machining by the machine tool 10, inputs of machining conditions to be applied, washing conditions for predetermined washing, and current state information about an inside of the machine tool 10; and the prediction unit 202 configured to input, to the trained model 250, the machining conditions to be applied, the washing conditions and the current state information about the inside of the machine tool received by the input unit 201, and predict state information about the inside of the machine tool after performing machining under the machining conditions to be applied and subsequent washing under the washing conditions.

According to the washing prediction apparatus 20, it is possible to eliminate confirmation by a visual sensor during machining and prevent accumulation of chips with the possible lowest washing frequency.

(4) The washing prediction apparatus 20 according to (3) may include the decision making unit 203 that decides a washing timing at which the quantity of workpiece production is the largest, based on a comparison between a predicted value included in the state information about the inside of the machine tool predicted by the prediction unit 202 and a preset threshold.

By doing so, the washing prediction apparatus 20 can reduce time spent for washing as far as possible.

(5) The washing prediction apparatus 20a according to (3) may include the decision making unit 203 that decides the smallest number of times of the predetermined washing, for washing of the inside of the machine tool after performing the machining under the machining conditions to be applied, based on a comparison between a predicted value included in the state information about the inside of the machine tool predicted by the prediction unit 202 and a preset threshold.

By doing so, the washing prediction apparatus 20a can reduce the time spent for washing as far as possible.

(6) In the washing prediction apparatus 20a according to (5), content of the predetermined washing may be changed according to the decided number of times of the washing.

By doing so, the washing prediction apparatus 20a can shorten washing time more.

(7) In the washing prediction apparatus 20, 20a according to any of (3) to (6), the trained model 250 may be provided in a server 50 connected so as to be accessible from the washing prediction apparatus 20, 20a via a network 60.

By doing so, the washing prediction apparatus 20, 20a can apply the trained model 250 even when a new machine tool 10 is arranged.

(8) The washing prediction apparatus 20, 20a according to any of (3) to (7) may include the machine learning apparatus 30 according to (1) or (2).

By doing so, the washing prediction apparatus 20, 20a can have effects similar to the effects of any of (1) to (7).

(9) The washing system 1, 1A of the present disclosure includes: the washing prediction apparatus 20, 20a according to any of (3) to (8); and the washing device 101.

The washing system 1, 1A can have effects similar to the effects of any of (1) to (8).

(10) In the washing system 1, 1A according to (9), the washing device 101 may be provided inside the machine tool 10.

By doing so, the washing system 1, 1A can have effects similar to the effects of any of (1) to (8).

(11) In the washing system 1, 1A according to (9), the washing device 101 may be attached to or included in a robot.

By doing so, the washing system 1, 1A can have effects similar to the effects of any of (1) to (8).

EXPLANATION OF REFERENCE NUMERALS

1, 1A: Washing system
10: Machine tool
101: Washing device
102: Measurement device
103: Control device
20, 20*a*: Washing prediction apparatus
201: Input unit
202: Prediction unit
203: Decision making unit
204: Notification unit
205: Storage unit
250: Trained model
30: Machine learning apparatus
301: Input data acquisition unit
302: Label acquisition unit
303: Learning unit
304: Storage unit

The invention claimed is:

1. A machine learning apparatus comprising:
a memory configured to store a program; and
a processor configured to execute the program and control the machine learning apparatus to:
acquire input data, the input data including arbitrary machining conditions for an arbitrary machine tool to machine arbitrary workpieces, washing conditions for an arbitrary washing device to wash an inside of a machine tool where the arbitrary workpieces have been machined under the arbitrary machining conditions, and state information indicating a degree of soil inside the machine tool before machining under the arbitrary machining conditions;
acquire, as label data, state information about the inside of the machine tool after performing machining under the arbitrary machining conditions included in the input data and subsequent washing under the washing conditions included in the input data; and
execute supervised learning using the acquired input data and the acquired label data, and generate a trained model.

2. The machine learning apparatus according to claim 1, wherein
the machining conditions include at least a type of the machine tool, material of workpieces, a type of a cutting tool, a spindle speed, a feed rate, a depth of cut, and a quantity of workpiece production indicating a number of workpieces to be machined; and
the washing conditions include at least number of times of predetermined washing.

3. A washing prediction apparatus comprising:
a second memory configured to store a second program and the trained model generated by the machine learning apparatus according to claim 1; and a second processor configured to execute the second program and control the washing prediction apparatus to:
receive, prior to machining by the machine tool, inputs of machining conditions to be applied, washing conditions for predetermined washing, and current state information about an inside of the machine tool;
input, to the trained model, the received inputs of the machining conditions to be applied, the washing conditions and the current state information about the inside of the machine tool, and predict state information about the inside of the machine tool after performing machining under the machining conditions to be applied and subsequent washing under the washing conditions;
decide a washing timing at which a quantity of workpiece production is largest, based on a comparison between a predicted value included in the state information about the inside of the machine tool and a preset threshold; and
output the decided washing timing to at least the machine tool,
wherein the inside of the machine tool is washed based on the washing timing output from the second processor.

4. A washing prediction apparatus comprising:
a second memory configured to store a second program and the trained model generated by the machine learning apparatus according to claim 1; and
a second processor configured to execute the second program and control the washing prediction apparatus to:
receive, prior to machining by the machine tool, inputs of machining conditions to be applied, washing conditions for predetermined washing, and current state information about an inside of the machine tool;
input, to the trained model, the received inputs of the machining conditions to be applied, the washing conditions and the current state information about the inside of the machine tool, and predict state information about the inside of the machine tool after performing machining under the machining conditions to be applied and subsequent washing under the washing conditions;
decide a smallest number of times of the predetermined washing, for washing of the inside of the machine tool after performing the machining under the machining conditions to be applied, based on a comparison between a predicted value included in the state information about the inside of the machine tool predicted by the prediction unit and a preset threshold; and
output the decided washing timing to at least the machine tool,
wherein the inside of the machine tool is washed based on the washing timing output from the second processor.

5. The washing prediction apparatus according to claim 4, wherein content of the predetermined washing is changed according to the smallest number of times of the predetermined washing which was decided.

6. The washing prediction apparatus according to claim 3, wherein the trained model is provided in a server connected so as to be accessible from the washing prediction apparatus via a network.

7. The washing prediction apparatus according to claim 3, comprising
the machine learning apparatus.

8. A washing system comprising:

the washing prediction apparatus according to claim 3; and a washing device.

9. The washing system according to claim 8, wherein the washing device is provided inside the machine tool.

10. The washing system according to claim 8, wherein the washing device is attached to or included in a robot.

\* \* \* \* \*